(12) United States Patent
Matsumoto

(10) Patent No.: US 11,200,651 B2
(45) Date of Patent: Dec. 14, 2021

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Tetsuya Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 288 days.

(21) Appl. No.: 16/580,861

(22) Filed: Sep. 24, 2019

(65) Prior Publication Data

US 2020/0104986 A1 Apr. 2, 2020

(30) Foreign Application Priority Data

Sep. 28, 2018 (JP) .............................. JP2018-184355

(51) Int. Cl.
*G06T 5/50* (2006.01)
*G06T 1/60* (2006.01)
*G06K 9/00* (2006.01)
*G06T 1/20* (2006.01)

(52) U.S. Cl.
CPC ............ *G06T 5/50* (2013.01); *G06K 9/00664* (2013.01); *G06T 1/20* (2013.01); *G06T 1/60* (2013.01); *G06T 2200/28* (2013.01)

(58) Field of Classification Search
CPC .... G06T 5/50; G06T 1/20; G06T 1/60; G06T 2200/28; G06K 9/00664
See application file for complete search history.

(56) References Cited

U.S. PATENT DOCUMENTS

| 5,946,444 A * | 8/1999 | Evans ................. G11B 27/028 386/200 |
| 6,091,771 A * | 7/2000 | Seeley ..................... G06F 3/14 348/153 |
| 6,122,411 A * | 9/2000 | Shen ........................ G06T 1/60 358/404 |

(Continued)

FOREIGN PATENT DOCUMENTS

| CN | 101976252 A | 2/2011 |
| CN | 105590090 A | 5/2016 |

(Continued)

OTHER PUBLICATIONS

An Office Action issued by the China National Intellectual Property Administration dated Sep. 30, 2020, which corresponds to Chinese Application No. 201910922231.0 and is related to U.S. Appl. No. 16/580,861 with English language translation.

(Continued)

*Primary Examiner* — Manav Seth
(74) *Attorney, Agent, or Firm* — Studebaker & Brackett PC

(57) ABSTRACT

Provided are an image processing apparatus, an image processing method, and an image processing program capable of obtaining an enjoyable image for a user unexpectedly. The user selects images from image groups imaged from January to December 2017 as an image to be printed. From not-selected remaining images, an image having an attribute in which a frequency for the attribute contained in each image is equal to or less than a threshold is found and printed. Since the obtained image is an image irrelevant to the images selected by the user, the image unexpected for the user can be obtained.

14 Claims, 8 Drawing Sheets

(56) References Cited

U.S. PATENT DOCUMENTS

| | | | | |
|---|---|---|---|---|
| 6,369,908 B1* | 4/2002 | Frey | ................. | G03D 15/001 |
| | | | | 358/1.15 |
| 6,608,563 B2* | 8/2003 | Weston | ................. | G06F 16/58 |
| | | | | 340/573.1 |
| 7,027,070 B2* | 4/2006 | Makinen | ............... | G06F 3/0481 |
| | | | | 345/619 |
| 7,446,800 B2* | 11/2008 | Holmes | .............. | H04N 1/00167 |
| | | | | 348/207.99 |
| 7,652,709 B2* | 1/2010 | Kanda | ................. | H04N 1/217 |
| | | | | 348/333.02 |
| 7,836,090 B2* | 11/2010 | Perrizo | ............... | G06F 16/283 |
| | | | | 707/797 |
| 8,184,913 B2* | 5/2012 | Baker | ................. | G06K 9/6219 |
| | | | | 382/218 |
| 8,244,101 B2* | 8/2012 | Green | ................. | H04N 5/76 |
| | | | | 386/250 |
| 8,264,587 B2* | 9/2012 | Yong | ................. | H04N 5/341 |
| | | | | 348/333.12 |
| 8,327,253 B2* | 12/2012 | Han | ................. | H04N 1/00196 |
| | | | | 715/202 |
| 8,634,590 B2* | 1/2014 | Hasegawa | .......... | H04N 21/4117 |
| | | | | 382/103 |
| 8,994,833 B2* | 3/2015 | Holmes | .............. | H04N 1/00188 |
| | | | | 348/207.99 |
| 9,031,383 B2* | 5/2015 | Sandrew | ............... | G11B 27/00 |
| | | | | 386/278 |
| 9,081,484 B2* | 7/2015 | Han | ................. | G06F 3/04847 |
| 9,183,446 B2* | 11/2015 | Okawa | .............. | G06K 9/00771 |
| 9,396,258 B2* | 7/2016 | Chu | ................. | H04N 21/482 |
| 9,633,257 B2* | 4/2017 | Filimonova | .............. | G06K 9/46 |
| 9,727,221 B2* | 8/2017 | Han | ................. | H04N 1/00148 |
| 10,123,065 B2* | 11/2018 | Lyons | ................. | G06F 16/71 |
| 11,030,730 B2* | 6/2021 | Benson | ................. | G06T 5/50 |
| 2003/0133159 A1* | 7/2003 | Grosso | .............. | H04N 1/00188 |
| | | | | 358/1.18 |
| 2003/0161009 A1* | 8/2003 | Yokoo | ................ | H04N 1/32128 |
| | | | | 358/302 |
| 2004/0201683 A1* | 10/2004 | Murashita | ............ | H04N 1/2179 |
| | | | | 348/207.1 |
| 2006/0114520 A1* | 6/2006 | Enomoto | ........... | H04N 1/00188 |
| | | | | 358/448 |
| 2007/0250490 A1* | 10/2007 | Okawa | .................... | G06F 16/54 |
| 2008/0267584 A1* | 10/2008 | Green | ................. | H04N 21/812 |
| | | | | 386/250 |
| 2008/0301133 A1* | 12/2008 | Brown | ............... | G06F 16/9024 |
| 2010/0067787 A1 | 3/2010 | Yamazoe | | |
| 2010/0142833 A1 | 6/2010 | Ishizawa | | |
| 2010/0177246 A1* | 7/2010 | Yong | ..................... | H04N 5/341 |
| | | | | 348/580 |
| 2012/0117473 A1* | 5/2012 | Han | ...................... | G06F 3/0483 |
| | | | | 715/723 |
| 2013/0080897 A1* | 3/2013 | Han | ................... | H04N 1/00148 |
| | | | | 715/723 |
| 2015/0293688 A1* | 10/2015 | Han | ..................... | G11B 27/034 |
| | | | | 715/719 |
| 2016/0014482 A1* | 1/2016 | Chen | ................ | H04N 21/26258 |
| | | | | 386/241 |
| 2016/0132734 A1 | 5/2016 | Lee | | |
| 2016/0179846 A1 | 6/2016 | Tobita | | |
| 2016/0371536 A1* | 12/2016 | Yamaji | ................ | G06K 9/00677 |
| 2017/0083545 A1* | 3/2017 | Tsutaoka | ............. | G06F 16/5866 |
| 2018/0132011 A1* | 5/2018 | Shichman | .......... | H04N 21/8456 |
| 2018/0165856 A1 | 6/2018 | Kunieda et al. | | |
| 2021/0120058 A1* | 4/2021 | Schmidt | ............... | H04L 65/602 |

FOREIGN PATENT DOCUMENTS

| | | |
|---|---|---|
| JP | 2010067186 A | 3/2010 |
| JP | 2010-141412 A | 6/2010 |
| JP | 2016-119508 A | 6/2016 |
| JP | 2017-010251 A | 1/2017 |
| JP | 2017-037417 A | 2/2017 |
| JP | 2017059124 A | 3/2017 |
| JP | 2017-161993 A | 9/2017 |
| JP | 2018-097481 A | 6/2018 |

OTHER PUBLICATIONS

An Office Action issued by the China National Intellectual Property Administration on Feb. 20, 2021, which corresponds to Chinese Application No. 201910922231.0 and is related to U.S. Appl. No. 16/580,861 with English language translation.

An Office Action; "Notice of Reasons for Refusal", mailed by the Japanese Patent Office dated Aug. 3, 2021, which corresponds to Japanese Patent Application No. 2018-184355 and is related to U.S. Appl. No. 16/580,861; with English language translation.

\* cited by examiner

FIG. 8
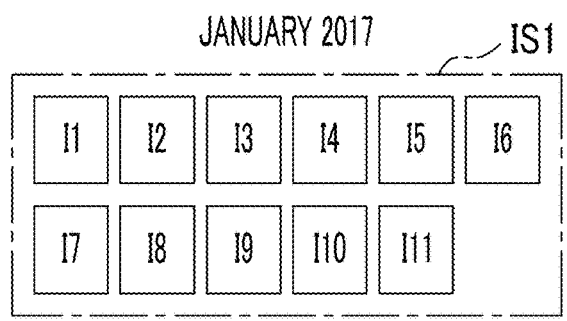
JANUARY 2017 — IS1
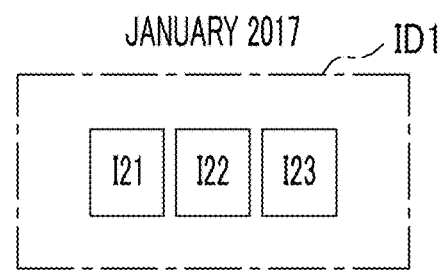
JANUARY 2017 — ID1
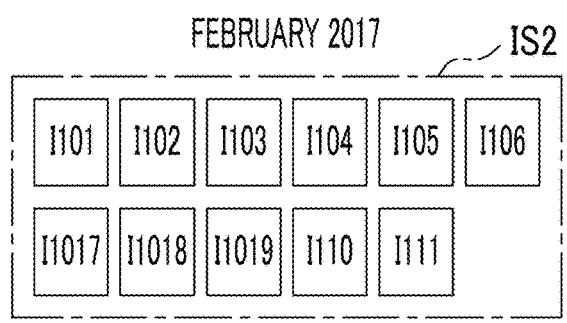
FEBRUARY 2017 — IS2
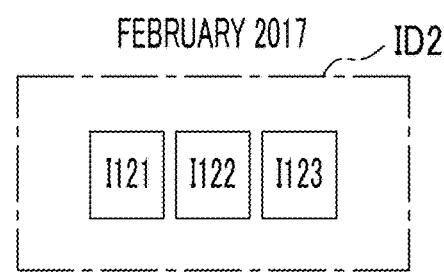
FEBRUARY 2017 — ID2
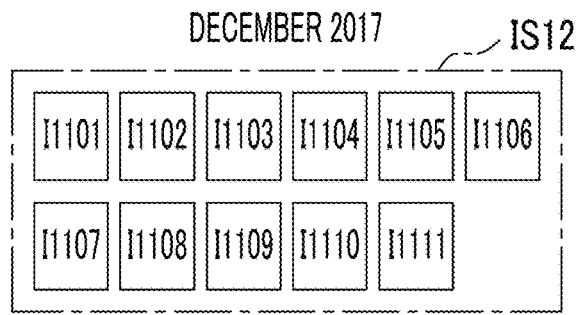
DECEMBER 2017 — IS12
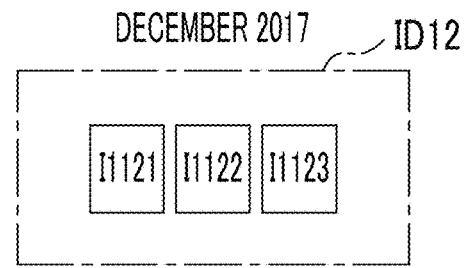
DECEMBER 2017 — ID12
STORY OF MAIN ROLE
STORY OF SUPPORTING ROLE

IMAGE PROCESSING APPARATUS, IMAGE PROCESSING METHOD, AND IMAGE PROCESSING PROGRAM

CROSS-REFERENCE TO RELATED APPLICATIONS

The present application claims priority under 35 U.S.C. § 119 to Japanese Patent Application No. 2018-184355, filed Sep. 28, 2018. Each of the above application(s) is hereby expressly incorporated by reference, in its entirety, into the present application.

BACKGROUND OF THE INVENTION

Field of the Invention

The invention relates to an image processing apparatus, an image processing method, and an image processing program.

Description of the Related Art

Extremely large numbers of images are captured along with widespread use of digital cameras, smartphones, and the like. Since it is time-consuming to find a desired image among large numbers of images, it is considered that an image having high importance to a user is automatically extracted (JP2017-010251A), an image valuable to a user is extracted (JP2017-059124A), and an image highly satisfactory for a user is preferentially extracted (JP2010-067186A).

SUMMARY OF THE INVENTION

However, even in a case of an image not recognized as an image important to a user or an image valuable to a user, an enjoyable image for the user may be buried in a large number of captured images, actually. In JP2017-010251A, the image having high importance to the user is extracted, so that a consideration as to extracting an image not recognized as important to the user is not made. In JP2017-059124A, the image valuable to the user is extracted, so that an image recognized as not valuable to the user cannot be extracted. In JP2010-067186A, the image highly satisfactory for the user is extracted, so that an image recognized as less satisfactory for the user is not extracted.

An object of the invention is to obtain an enjoyable image for a user unexpectedly.

An image processing apparatus according to the invention comprises a first detection device (first detection means) for detecting, from a first image group, a first remaining image excluding one or a plurality of first images selected from the first image group, a second detection device (second detection means) for detecting, from a second image group, a second remaining image excluding one or a plurality of second images selected from the second image group, and an image output device (image output means) for outputting an image having an attribute in which a frequency for the attribute contained in the image is equal to or less than a first threshold, from the first remaining image and the second remaining image.

The invention also provides an image processing method suitable for the image processing apparatus. That is, the method comprises detecting, from a first image group, a first remaining image excluding one or a plurality of first images selected from the first image group by a first detection device (first detection means), detecting, from a second image group, a second remaining image excluding one or a plurality of second images selected from the second image group by a second detection device (second detection means), and outputting an image having an attribute in which a frequency for the attribute contained in the image is equal to or less than a first threshold, from the first remaining image and the second remaining image by an image output device (image output means).

The invention also provides a program controlling a computer of an image processing apparatus and a recording medium (portable recording medium) storing the program.

Further, the image processing apparatus may include a processor, and the processor may detect, from a first image group, a first remaining image excluding one or a plurality of first images selected from the first image group, detect, from a second image group, a second remaining image excluding one or a plurality of second images selected from the second image group, and output an image having an attribute in which a frequency for the attribute contained in the image is equal to or less than a first threshold, from the first remaining image and the second remaining image.

For example, the image output device outputs an image having an attribute in which the frequency for the attribute contained in the image is equal to or less than the first threshold and equal to or more than a second threshold.

In addition, for example, the image output device may output an image having an attribute in which the frequency for the attribute contained in the image is equal to or less than a threshold, from each of the first remaining image and the second remaining image.

The image output device may output an image of which a similarity to the first image and the second image is equal to or less than a threshold, as the image having an attribute in which the frequency for the attribute contained in the image is equal to or less than the first threshold, from the first remaining image and the second remaining image.

In the image output device, the frequency for the attribute contained in the image may be an appearance frequency of a main subject included in the image.

For example, the main subject may belong to at least one of a person or an article.

In the image output device, for example, the frequency for the attribute contained in the image is the number of captured images of an imaging date, an imaging location, a photographer, or an imaging target.

The image output device sets, for example, as the attribute contained in the image, a subject excluding a main subject for which a frequency is equal to or more than a third threshold in the first image and the second image, and outputs an image having the attribute in which the frequency for the attribute contained in the image is equal to or less than the first threshold, from the first remaining image and the second remaining image.

The image output device may set, for example, as the attribute contained in the image, the subject excluding the main subject for which the frequency is equal to or more than the third threshold in the first image and the second image, and output a predetermined number or more of images having the attribute in which the frequency for the attribute contained in the image is equal to or less than the first threshold, from the first remaining image and the second remaining image.

An imaging time period of the first image group and an imaging time period of the second image group may be different from each other.

The image processing apparatus may further comprise an image product creation device (image product creation means) for creating an image product using the image output from the image output device.

According to the invention, since the image having the attribute in which the frequency for the attribute contained in the image is equal to or less than the first threshold is output from the first remaining image and the second remaining image that are not selected, the output image becomes an enjoyable image for the user unexpectedly.

BRIEF DESCRIPTION OF THE DRAWINGS

FIG. 8 illustrates an image selected by a user and an image found from remaining images.

DESCRIPTION OF THE PREFERRED EMBODIMENTS

Figure 1:
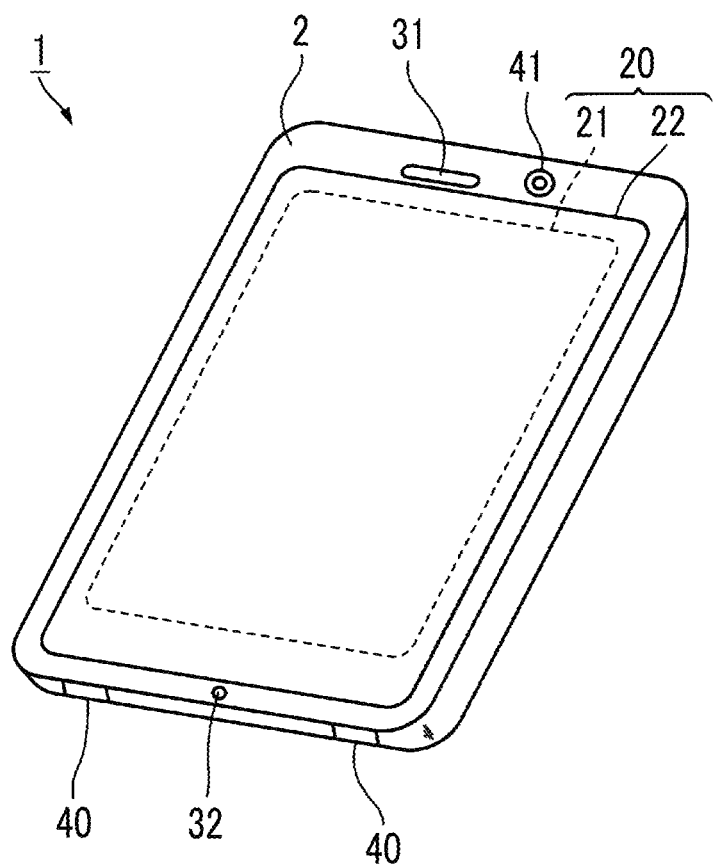
FIG. 1 illustrates the exterior of a smartphone.

FIG. 1 illustrates the exterior of a smartphone 1 (as an example of an image processing apparatus) as one embodiment of the image processing apparatus according to the invention. The smartphone 1 illustrated in FIG. 1 includes a casing 2 having a flat plate shape and comprises a display and input unit 20 in which a display panel 21 as a display unit and an operation panel 22 as an input unit are integrated on one surface of the casing 2. In addition, the casing 2 comprises a microphone 32, a speaker 31, an operation unit 40, and a camera unit 41. The configuration of the casing 2 is not limited thereto. For example, a configuration in which the display unit and the input unit are independent of each other can be employed, or a configuration having a folded structure or a sliding mechanism can be employed.

Figure 2:
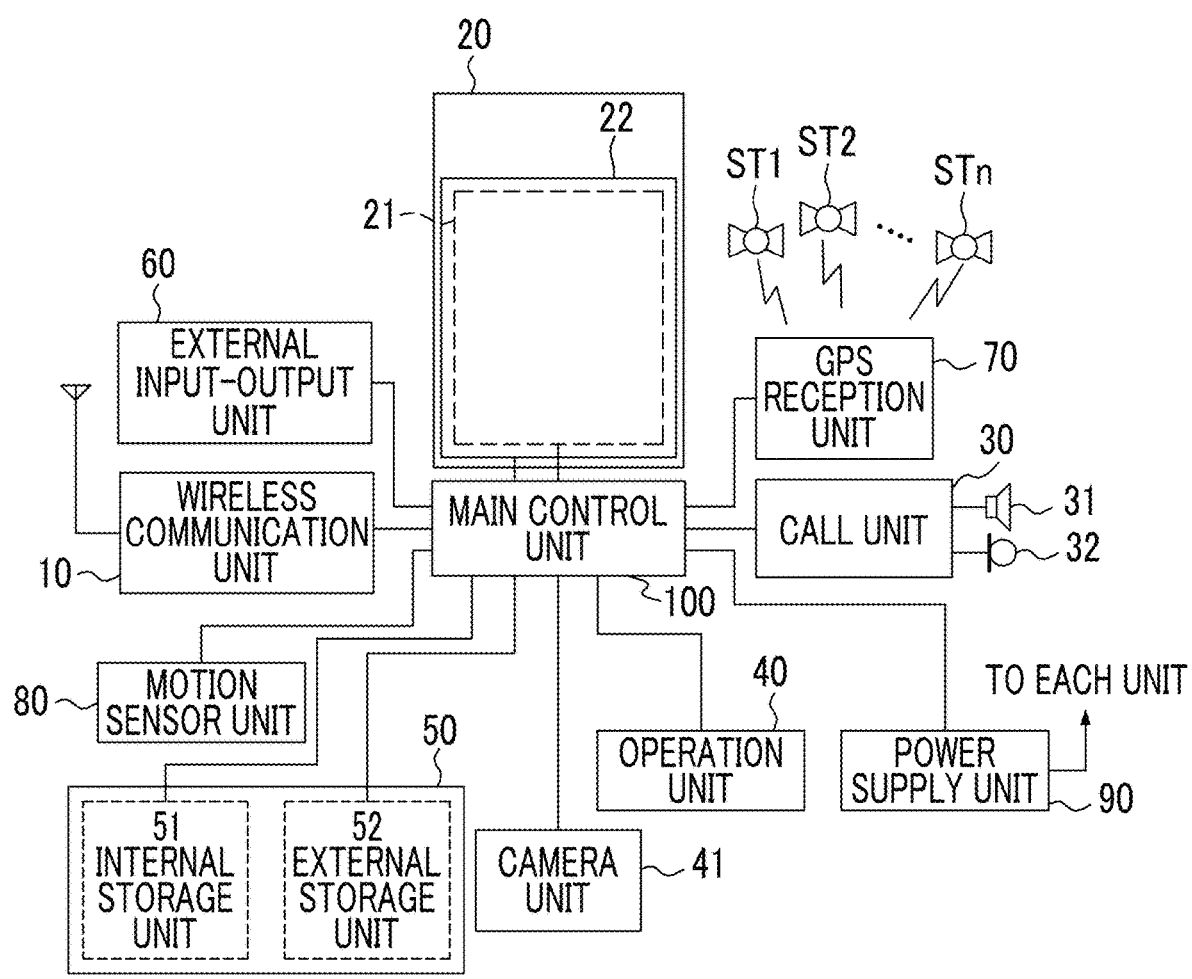
FIG. 2 is a block diagram illustrating an electric configuration of the smartphone.

FIG. 2 is a block diagram illustrating a configuration of the smartphone 1 illustrated in FIG. 1. As illustrated in FIG. 2, main constituents of the smartphone comprise a wireless communication unit 10, the display and input unit 20, a call unit 30, the operation unit 40, the camera unit 41, a storage unit 50, an external input-output unit 60, a global positioning system (GPS) reception unit 70, a motion sensor unit 80, a power supply unit 90, and a main control unit 100. In addition, main functions of the smartphone 1 have a wireless communication function of performing mobile wireless communication through a base station apparatus BS and a mobile communication network NW.

The wireless communication unit 10 performs wireless communication with the base station apparatus BS accommodated in the mobile communication network NW in accordance with an instruction from the main control unit 100. By using the wireless communication, transmission and reception of various file data such as voice data and image data, electronic mail data, and the like and reception of web data, streaming data, and the like are performed.

The display and input unit 20 is a so-called touch panel that visually delivers information to a user by displaying images (still images and motion images), text information, and the like and detects a user operation performed on the displayed information under control of the main control unit 100. The display and input unit 20 comprises the display panel 21 and the operation panel 22.

The display panel 21 uses a liquid crystal display (LCD), an organic electro-luminescence display (OELD), or the like as a display device. The operation panel 22 is a device that is mounted in a manner enabling visual recognition of an image displayed on a display surface of the display panel 21 and detects one or a plurality of coordinates operated by a finger of the user or a stylus. In a case where the device is operated by the finger of the user or the stylus, a detection signal generated by the operation is output to the main control unit 100. Next, the main control unit 100 detects an operation position (coordinates) on the display panel 21 based on the received detection signal.

As illustrated in FIG. 1, the display panel 21 and the operation panel 22 of the smartphone 1 illustrated as one embodiment of the image processing apparatus according to the present invention are integrated to constitute the display and input unit 20. The operation panel 22 is arranged to completely cover the display panel 21. In the case of employing such an arrangement, the operation panel 22 may have a function of detecting the user operation even in a region outside the display panel 21. In other words, the operation panel 22 may include a detection region for an overlapping part in overlap with the display panel 21 (hereinafter, referred to as a display region) and a detection region for the other peripheral part not in overlap with the display panel 21 (hereinafter, referred to as a non-display region).

The size of the display region may completely match the size of the display panel 21, but both sizes do not necessarily match. In addition, the operation panel 22 may include two sensitive regions including the peripheral part and the other inner part. Furthermore, the width of the peripheral part is appropriately designed depending on the size and the like of the casing 2. Furthermore, a position detection method employed in the operation panel 22 is exemplified by a matrix switch method, a resistive film method, a surface acoustic wave method, an infrared method, an electromagnetic induction method, an electrostatic capacitive method, and the like. Any method can be employed.

The call unit 30 comprises the speaker 31 and the microphone 32. The call unit 30 converts the voice of the user input through the microphone 32 into voice data processible in the main control unit 100 and outputs the voice data to the main control unit 100, or decodes the voice data received by the wireless communication unit 10 or the external input-output unit 60 and outputs the decoded voice data from the speaker 31. In addition, as illustrated in FIG. 1, for example, the speaker 31 can be mounted on the same surface as the surface on which the display and input unit 20 is disposed, and the microphone 32 can be mounted on a side surface of the casing 2.

The operation unit 40 is a hardware key using a key switch or the like and receives an instruction from the user. For example, as illustrated in FIG. 1, the operation unit 40 is a push-button type switch that is mounted on a side surface of the casing 2 of the smartphone 1. In a case where the operation unit 40 is pressed by the finger or the like, the operation unit 40 enters an ON state. In a case where the finger is released, the operation unit 40 enters an OFF state by a restoring force of a spring or the like.

The storage unit 50 stores a control program and control data of the main control unit 100, application software, address data in which a name, a telephone number, and the like of a communication counterpart are associated, data of transmitted and received electronic mails, web data downloaded by web browsing, and downloaded contents data and also temporarily stores streaming data and the like. In addition, the storage unit 50 is configured to include an internal storage unit 51 incorporated in the smartphone and an external storage unit 52 including a slot for an attachable and detachable external memory. Each of the internal storage unit 51 and the external storage unit 52 constituting the storage unit 50 is implemented using a storage medium such as a flash memory type memory, a hard disk type memory, a multimedia card micro type memory, a card type memory (for example, a MicroSD (registered trademark) memory), a random access memory (RAM), or a read only memory (ROM).

The external input-output unit 60 acts as an interface for all external apparatuses connected to the smartphone 1 and is directly or indirectly connected to other external apparatuses by communication (for example, Universal Serial Bus (USB) and IEEE 1394) or networks (for example, the Internet, a wireless LAN, Bluetooth (registered trademark), radio frequency identification (RFID), Infrared Data Association (IrDA) (registered trademark), Ultra Wideband (UWB) (registered trademark), and ZigBee (registered trademark)).

For example, the external apparatuses connected to the smartphone 1 include a wired/wireless headset, a wired/wireless external charger, a wired/wireless data port, a memory card or a subscriber identity module (SIM) card/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, a PDA connected in a wired/wireless manner, and an earphone connected in a wired/wireless manner. The external input-output unit can deliver data transferred from the external apparatuses to each constituent inside the smartphone 1 or transfer data inside the smartphone 1 to the external apparatuses.

The GPS reception unit 70 receives GPS signals transmitted from GPS satellites ST1 to STn, executes a position measurement calculation process based on the plurality of received GPS signals, and detects a position including the latitude, the longitude, and the altitude of the smartphone 1 in accordance with an instruction from the main control unit 100. When positional information can be obtained from the wireless communication unit 10 or the external input-output unit 60 (for example, a wireless LAN), the GPS reception unit 70 can detect the position using the positional information.

The motion sensor unit 80 comprises, for example, a 3-axis acceleration sensor and detects a physical motion of the smartphone 1 in accordance with an instruction from the main control unit 100. By detecting the physical motion of the smartphone 1, the movement direction and the acceleration of the smartphone 1 are detected. The detection result is output to the main control unit 100.

The power supply unit 90 supplies power stored in a battery (not illustrated) to each unit of the smartphone 1 in accordance with an instruction from the main control unit 100.

The main control unit 100 comprises a microprocessor, operates in accordance with the control program and the control data stored in the storage unit 50, and integrally controls each unit of the smartphone 1. In addition, the main control unit 100 has a mobile communication control function of controlling each unit of a communication system and an application processing function in order to perform voice communication and data communication through the wireless communication unit 10.

The application processing function is implemented by operating the main control unit 100 in accordance with the application software stored in the storage unit 50. For example, the application processing function includes an infrared communication function of performing data communication with an opposing device by controlling the external input-output unit 60, an electronic mail function of transmitting and receiving electronic mails, and a web browsing function of browsing a web page.

In addition, the main control unit 100 has an image processing function such as displaying a video on the display and input unit 20 based on image data (data of a still image or a motion image) such as reception data and downloaded streaming data. The image processing function is a function of causing the main control unit 100 to decode the image data, perform image processing on the decoding result, and display the image on the display and input unit 20.

Furthermore, the main control unit 100 executes display control of the display panel 21 and operation detection control for detecting the user operation performed through the operation unit 40 or the operation panel 22. By executing the display control, the main control unit 100 displays an icon for starting the application software or a software key such as a scroll bar or displays a window for composing an electronic mail. The scroll bar refers to a software key for receiving an instruction to move a display part of an image for a large image or the like not accommodated in the display region of the display panel 21.

In addition, by executing the operation detection control, the main control unit 100 detects the user operation performed through the operation unit 40, receives an operation performed on the icon or an input of a text string in an input field of the window through the operation panel 22, or receives a request for scrolling the display image through the scroll bar.

Furthermore, by executing the operation detection control, the main control unit 100 has a touch panel control function of determining whether the operation position on the operation panel 22 is in the overlapping part (display region) in overlap with the display panel 21 or the other peripheral part (non-display region) not in overlap with the display panel 21 and controlling the sensitive region of the operation panel 22 and the display position of the software key.

In addition, the main control unit 100 can detect a gesture operation performed on the operation panel 22 and execute a preset function depending on the detected gesture operation. The gesture operation is not a simple touch operation in the related art and means an operation of drawing a trajectory by the finger or the like or specifying a plurality of positions at the same time, or an operation of drawing a trajectory from at least one of the plurality of positions by a combination thereof.

The camera unit 41 is a digital camera performing electronic imaging using an imaging element such as a complementary metal oxide semiconductor (CMOS) or a charge-coupled device (CCD). In addition, the camera unit 41 converts the image data obtained by imaging into compressed image data in, for example, Joint Photographic Experts Group (JPEG) and records the image data in the storage unit 50 or outputs the image data through the external input-output unit 60 or the wireless communication unit 10 under control of the main control unit 100. As illustrated in FIG. 1, in the smartphone 1, the camera unit 41 is mounted on the same surface as the display and input unit 20. However, the mounting position of the camera unit 41 is not limited thereto. The camera unit 41 may be mounted on the rear surface of the display and input unit 20, or a plurality of camera units 41 may be mounted. In a case where the plurality of camera units 41 are mounted, imaging may be performed by a single camera unit 41 by switching the camera unit 41 performing the imaging, or imaging may be performed using the plurality of camera units 41 at the same time.

In addition, the camera unit 41 can be used in various functions of the smartphone 1. For example, the image obtained by the camera unit 41 can be displayed on the display panel 21, or the image of the camera unit 41 can be used as an operation input of the operation panel 22. In addition, in the detection of the position by the GPS reception unit 70, the position can be detected with reference to the image from the camera unit 41. Furthermore, with reference to the image from the camera unit 41, a determination of the optical axis direction of the camera unit 41 of the smartphone 1 and a determination of the current usage environment can be performed without using the 3-axis acceleration sensor or along with the 3-axis acceleration sensor. The image from the camera unit 41 can also be used in the application software.

Besides, the image data of the still picture or the motion picture can be recorded in the storage unit 50 or output through the external input-output unit 60 or the wireless communication unit 10 by adding the positional information obtained by the GPS reception unit 70, voice information (may be text information obtained by performing voice-to-text conversion by the main control unit or the like) obtained by the microphone 32, attitude information obtained by the motion sensor unit 80, and the like to the image data.

A program obtained through the Internet or the like is installed in advance on the smartphone 1. The process to be described below starts by starting the program. In addition, the program may be stored in a recording medium such as the external storage unit 52, and the program read from the external storage unit 52 may be installed on the smartphone 1.

In the embodiment, a plurality of images are selected monthly by the user from a collection (image group) of multiple images captured every month. A plurality of images may be automatically selected every month. The selected images are printed.

Figure 3:
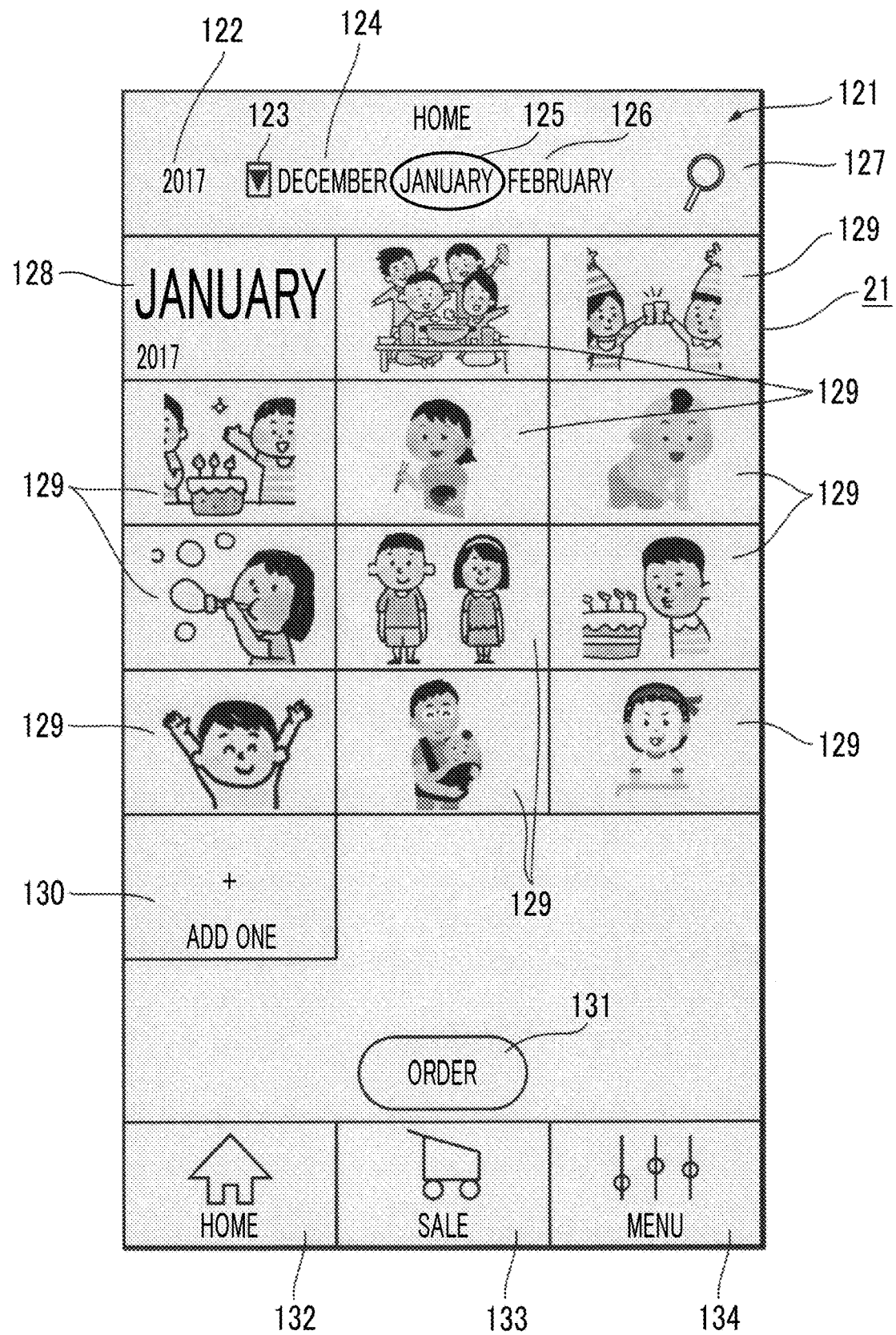
FIG. 3 is one example of a home screen.

FIG. 3 is one example of the home screen displayed on the display panel 21 of the smartphone 1.

Eleven image display regions 129 are formed almost throughout the home screen (the number of image display regions 129 may be less than 11 or greater than or equal to 12). An imaging year and month display region 128 is displayed in almost the upper left portion of the home screen. The imaging year and month display region 128 displays a text string "January" and a text string "2017". The imaging year and month display region 128 of the home screen after the start of the program displays the year and month corresponding to the time of the start of the program.

An imaging year and month specifying region 121 is formed in the upper portion of the home screen. An imaging year display region 122 and a pull-down button 123 are formed in the imaging year and month specifying region 121. By pulling down the pull-down button 123, a pull-down menu is shown, and the user can select the desired imaging year. Imaging month specifying regions 124, 125, and 126 are formed on the right side of the imaging year display region 122. By scrolling the imaging year and month specifying region 121 to the right and left, months displayed in the imaging month specifying regions 124, 125, and 126 are switched. In the home screen illustrated in FIG. 3, the imaging month specifying regions 124, 125, and 126 display "December" (December 2016), "January", and "February", respectively. The text string "January" displayed in the imaging month specifying region 125 at the center is surrounded. By surrounding "January", it is shown that "January" is selected as a month in which images displayed in the image display regions 129 are captured. A search button 127 is formed on the right side of the imaging month specifying region 125. An image addition region 130 is formed on the lower left side of the image display regions 129. By touching the image addition region 130, the number of image display regions 129 displayed on the home screen is increased by one.

An order button 131 on which a text string "order" is displayed is displayed in the lower portion of the home screen. The order button 131 is touched in the case of ordering a print of the image. In addition, a home button 132 on which a text string "home" is displayed, a sale button 133 on which a text string "sale" is displayed, and a menu button 134 on which a text string "menu" is displayed are formed in the lowermost portion of the home screen.

Since the imaging year and month display region 128 of the home screen after the start of the program displays the year and month corresponding to the time of the start of the program, the image is not displayed in the image display regions 129 in a condition where the image is not selected and the image is displayed in the image display regions 129 in a condition where the image is selected, from the images captured in the year and month corresponding to the time of the start of the program. The example illustrated in FIG. 3 is one example of displaying the eleven images, in the image display regions 129, which are selected from the images captured in January 2017.

Figure 4:
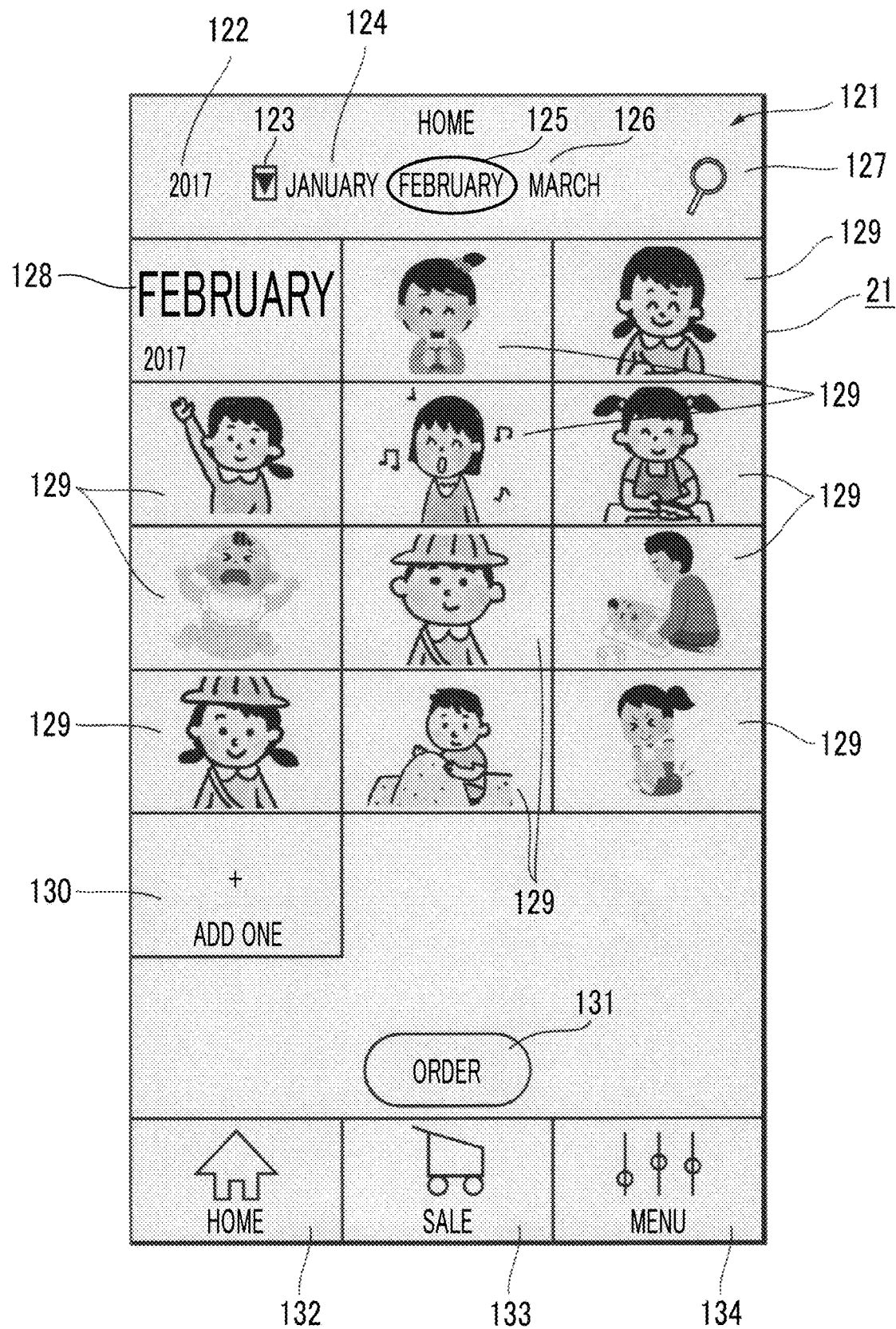
FIG. 4 is one example of the home screen.

FIG. 4 is also one example of the home screen displayed on the display panel 21 of the smartphone 1.

The image display regions 129 of the home screen illustrated in FIG. 3 display images selected from the images captured in January 2017. Meanwhile, the image display regions 129 of the home screen illustrated in FIG. 4 display images selected from the images captured in February 2017.

An image is selected in the same manner from the captured images after March 2017. The user selects the images every month from the multiple images that are captured every month. The image data representing the selected image is transmitted to an order receiving server and the image is printed. The print is mailed to the user, and the user simply organizes the mailed print into an album, so that the user can get the album recording the growth of the family. However, when ordering, the user may select an image captured on the month and day around the month of the order.

Figure 5:
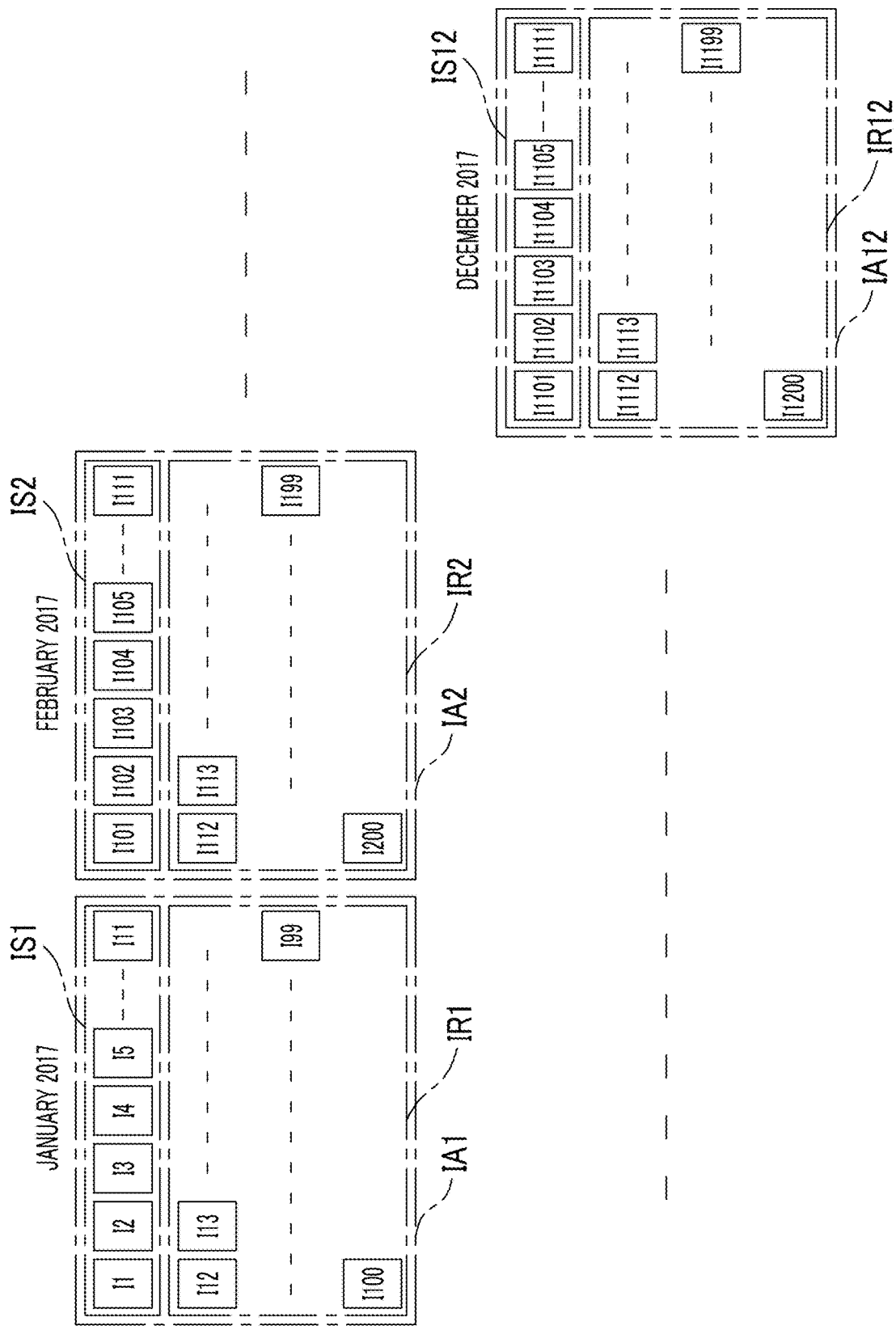
FIG. 5 is one example of a captured image.

FIG. 5 illustrates the relation between images captured from January 2017 to December 2017 and the selected images.

In January 2017, 100 images from an image I1 to an image I100 are captured. The 100 images from the image I1 to the image I100 are set as an image group IA1 for January 2017. Eleven images of the image I1 to the image I11 are selected from the image I1 to the image I100 included in the image group IA1 for January 2017. The selected images of the image I1 to the image I11 are an image IS1 selected in January 2017. The selected images of the image I1 to the image I11 are the images displayed in the image display regions 129, as illustrated in FIG. 3. The image I12 to the image I100 excluding the selected image IS1 are remaining images IR1 for January 2017 among the image I1 to the image I100 included in the image group IA1 for January 2017. The remaining images IR1 for January 2017 are images not selected from the image I1 to the image I100 included in the image group IA1 for January 2017.

Similarly, in February 2017, 100 images from an image I101 to an image I200 are captured. The 100 images from the image I101 to the image I200 are set as an image group IA2 for February 2017. Eleven images of the image I101 to the image I111 are selected from the image I101 to the image I200 included in the image group IA2 for February 2017. The selected images of the image I101 to the image I111 are an image IS2 selected in February 2017. The selected images of the image I101 to the image I111 are the images displayed in the image display regions 129, as illustrated in FIG. 4. The image I112 to the image I200 excluding the selected image IS2 are remaining images IR2 for February 2017 among the image I101 to the image I200 included in the image group IA2 for February 2017. The remaining images IR2 for February 2017 are images not selected from the image I101 to the image I200 included in the image group IA2 for February 2017.

Similarly, in the other months, a large number of images are also captured every month and images are selected every month from the large number of images. In December 2017, 100 images from an image I1101 to an image I1200 are captured. The 100 images from the image I1101 to the image I1200 are set as an image group IA12 for December 2017. Eleven images of the image I1101 to the image I1111 are selected from the image I1101 to the image I1200 included in the image group IA12 for December 2017. The selected images of the image I1101 to the image I1111 are an image IS12 selected in December 2017. The image I1112 to the image I1200 excluding the selected image IS12 are remaining images IR12 for December 2017 among the image I1101 to the image I1200 included in the image group IA12 for December 2017. The remaining images IR12 for December 2017 are images not selected from the image I1101 to the image I1200 included in the image group IA12 for December 2017.

As described above, while there are images selected every month, there are also images not selected. In the embodiment, it is possible to find the image that the user does not expect from the images not selected. In FIG. 5, 100 images, as the same number of images, are captured every month and 11 images, as the same number of images, are selected every month. Meanwhile, the same number of images may not be captured every month and the same number of images may not be selected every month.

Figure 6:
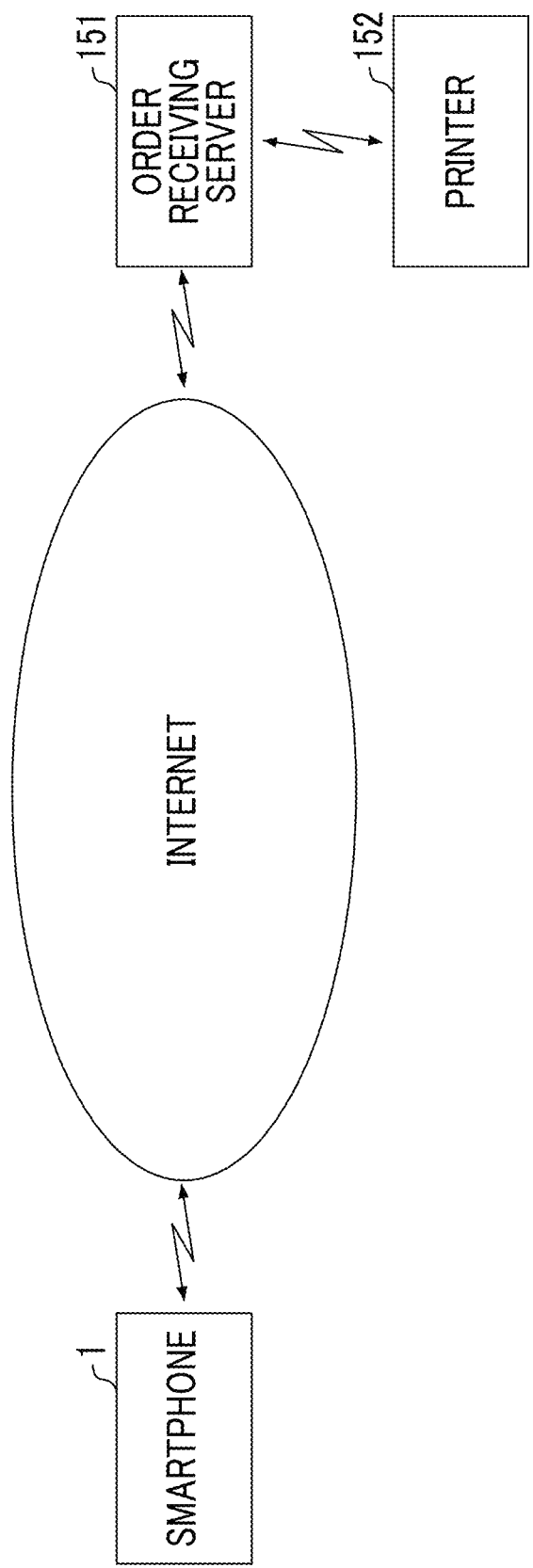
FIG. 6 illustrates an overview of an editing system.

FIG. 6 illustrates an overview of an image editing system according to the embodiment.

The smartphone 1 and an order receiving server 151 can communicate with each other through the Internet. In addition, the order receiving server 151 and the printer 152 can communicate with each other.

In a case where image data is transmitted from the smartphone 1 to the order receiving server 151, the image data received by the order receiving server 151 is transmitted to the printer 152. An image represented by the image data is printed. The print is mailed to the user.

As described above, the image data representing the images selected by the user is transmitted to the order receiving server 151 every month, so that print of the images selected by the user is delivered to the user every month. In the embodiment, as described below, except for the image data representing the images selected by the user, images that the user considers to be uncommon are determined from the images not selected by the user. The image data representing the determined images is transmitted to the order receiving server 151 every month, so that prints except the images selected by the user are delivered to the user every month (the prints may not be delivered every month, and without printing, the images that the user considers to be uncommon may be determined and then the determined images may be notified to the user). The prints of the images unexpected for the user are delivered, which increase the fun.

Figure 7:
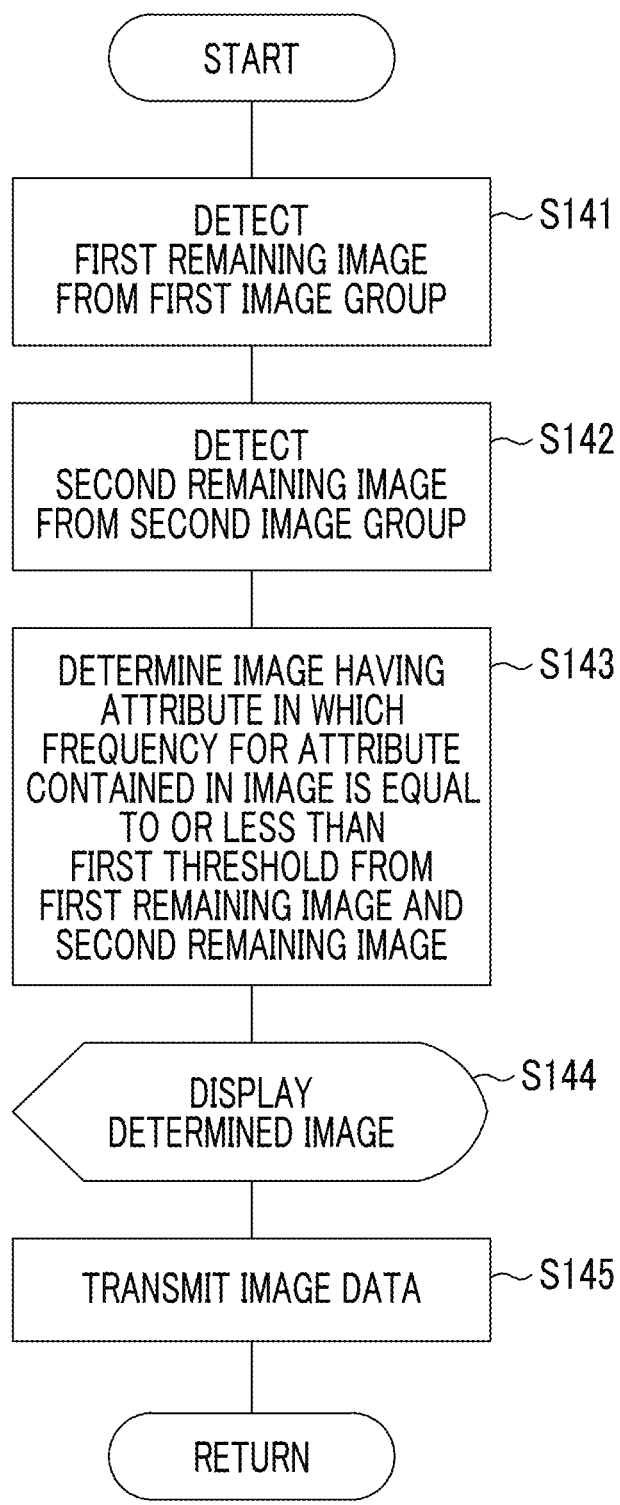
FIG. 7 is a flowchart illustrating a process procedure of the smartphone.

FIG. 7 is a flowchart illustrating a process procedure of the smartphone 1.

In a case where a menu button 134 included in the home screen is touched, a selection button of a remaining image mode appears so as to find images from the remaining images. In a case where the selection button is touched, a period of finding images (for example, one year from January 2017 to December 2017) is specified by the user and the processing procedure illustrated in FIG. 7 starts. In the embodiment, it is assumed that one year from January 2017 to December 2017 is specified.

A first remaining image is detected from a first image group by the main control unit 100 (which is an example of the first detection device) of the smartphone 1 (step 141) and a second remaining image is detected from a second image group by the main control unit 100 (which is an example of the second detection device) (step 142). The first image group is any of the image groups captured every month for one year from January 2017 to December 2017 specified (for example, the image group IA1 in January 2017) and the first image group may be one image group or a plurality of image groups. Assuming that the first image group is the image group IA1 for January 2017, the first remaining image is the remaining image IR1 for January 2017. The second image group is an image group different from the first image group (for example, the image group IA2 for February 2017, although the first image group and the second image group have different imaging time periods, they may have the same imaging time period) among the image groups captured every month for one year from January 2017 to December 2017, and may be one image group or a plurality of image groups. Assuming that the second image group is the image group IA2 for February 2017, the second remaining image is the remaining image IR2 for February 2017. As long as the first image group and the second image group are different from each other, both the first image group and the second image group may be one or a plurality of image groups. In the embodiment, it is assumed that the first image group is the image group IA1 for January 2017 and the second image group includes 11 image groups from the image group IA2 for February 2017 to the image group IA12 for December 2017. The first remaining image IR1 is detected from the first image group IA1 and each of the second remaining images IR2 to IR12 is detected from each of the second image groups IA2 to IA12.

Next, from the first remaining image IR1 and each of the second remaining images IR2 to IR12, the main control unit 100 determines an image having an attribute in which a frequency for the attribute contained in the image is equal to or less than a first threshold (step 143). The "attribute contained in the image" refers to various properties of the image derived from the image and for example, the properties include a main subject contained in the image, an imaging date of the image, an imaging location of the image, a photographer of the image, or an imaging target. For the main subject, the subject detection is performed from the image, and determination is made through the position, size, or the like of the subject in the image. For example, the determination is made as to whether the subject is present at the center position of the image and is a subject of a certain size or more in a size relative to the image. The main subject includes any of a person or an article. In addition, in a case where "n" images are present in a certain image group ("n" is a natural number), and "m" images having a certain attribute are present in the "n" images ("m" is a natural number), the "frequency for the attribute contained in the image" means a numerical value represented by m/n (including a numerical value displayed by multiplying and dividing a certain number, such as percentage display).

The determined image is displayed on the display panel 21 (which is an example of the image output device) (step 144) and the image data representing the determined image is transmitted from the wireless communication unit 10 (which is an example of the image output device) of the smartphone 1 to the order receiving server 151 (refer to FIG. 8) (step 145). The image data is transmitted from the order receiving server 151 to the printer 152 (which is an example of the image product creation device) and therefore, the print (which is an example of an image product) is performed. Since the print is mailed to the user, the user can receive the print representing the unexpected image, which is unlikely to be selected by the user himself or herself In the above embodiment, the determined image is displayed on the display panel 21 as a form of image output. However, the form of the output of the determined image may not be a form that can be recognized by the user, such as display on the display panel 21. For example, in the main control unit 100, even in a case where image data representing the determined image is subjected to processing such as image evaluation processing, it is considered that the image is output as long as the image data representing the determined image is obtained. As a result of performing the image evaluation processing for the image data, in a case where the evaluation is low, the image may not be displayed on the display panel 21. In such a case, the user does not recognize the determined image, but the image output itself is performed inside the main control unit 100.

Particularly, since the image, which is determined from the first remaining image IR1 and each of the second remaining images IR2 to IR12, is an image having an attribute in which the frequency for the attribute contained in the image is equal to or less than the first threshold, an image having an attribute with a high appearance frequency in the first remaining image IR1 and each of the second remaining images IR2 to IR12 is removed and the image unexpected for the user can be obtained.

The images IS1 to IS12, which are selected from the image groups IA1 to IA12 obtained from January 2017 to December 2017, and the images ID1 to ID12, which are determined by way of processing procedure illustrated in FIG. 7 from the remaining images IR1 to IR12 between January 2017 and December 2017, are illustrated in FIG. 8. The image ID1 includes the images I21, I22, and I23 that are determined from the remaining image IR1 and the image ID2 includes the images I121, I122, and I123 that are determined from the remaining image IR2. The same applies to the other images, and the image ID12 includes the images I1121, I1122, and I1123 that are determined from the remaining image IR12.

The selected images IS1 to IS12 are images selected as the images required by the user among a large number of images, and can be considered as representing a story of a main role (for example, a child in a user family) or the like in a plurality of people included in the images captured from January 2017 to December 2017. In contrast, the images ID1 to ID12, which are determined from the remaining images IR1 to IR12, are images determined from the remaining images IR1 to IR12 that the user does not consider necessary to represent every month, and can be considered as representing a story of a supporting role (for example, user's parents who cannot meet so often because they live far away) or the like in a plurality of people included in the images captured from January 2017 to December 2017. The image representing the story of the supporting role unexpected for the user can be obtained. Alternatively, an image of the story in which an article such as a bicycle is a supporting role can be obtained.

In the above embodiment, the main control unit 100 determines the image having the attribute in which the frequency for the attribute contained in the image is equal to or less than the first threshold, from the first remaining image IR1 and each of the second remaining images IR2 to IR12. However, the main control unit 100 may determine an image having the attribute in which the frequency for the attribute contained in the image is equal to or less than the first threshold and equal to or more than a second threshold. Since the image having the attribute in which the frequency for the attribute contained in the image is equal to or more than the second threshold is determined from the first remaining image IR1 and each of the second remaining images IR2 to IR12, the image in which the frequency for the attribute contained in the image is too low is removed.

Further, in the example illustrated in FIG. 8, although the image is determined from both the first remaining image IR1 and each of the second remaining images IR2 to IR12, the image may be determined from the first remaining image IR1 or the second remaining images IR2 to IR12. For example, the image may be determined from only the first remaining image IR1 and the image may be determined from at least one remaining image of the second remaining images IR2 to IR12.

Furthermore, the main control unit 100 may calculate a similarity to the first image IS1 selected from the image group IA1 for January 2017 and the second images IS2 to IS12 selected from the second image groups IA2 to IA12 for February 2017 to December 2017, and may determine and output the image having the calculated similarity that is equal to or less than a threshold, as the image having an attribute in which the frequency for the attribute contained in the image is equal to or less than the first threshold, from the first remaining image IR1 and the second remaining images IR2 to IR12. For example, an image that is not similar to any of the images I1 to I11 included in the first image IS1 selected from the image group IA1 for January 2017 and that is not similar to the images I101 to I111 included in the second images IS2 to IS12 selected from the image groups IA2 to IA12 for February 2017 to December 2017, is determined. Since the image not similar to the image selected by the user is found and printed as described above, the image more unexpected for the user can be obtained.

Further, in a case where the attribute contained in the image is the main subject included in the image, it becomes possible to obtain an image including a subject different from the main subject, a subject not photographed together with the main subject, and a subject that does not often appear in the image. The user can obtain an image including the subject captured unconsciously and forgotten.

In a case where the attribute contained in the image is the imaging date, an image captured in an imaging date different from the imaging date of the image selected by the user can be found. For example, in a case where the imaging date of the image selected by the user is a holiday in many cases, the image captured in the imaging date other than the holiday may be found in the image output means of the present embodiment. In a case where the attribute contained in the image is the imaging location, an image captured at an imaging location different from the imaging location of the image selected by the user can be found. For example, the different imaging location includes a location other than the tourist attraction, a location where the user usually does not visit, or a location far away from the user's home. In addition, in a case where the attribute contained in the image is a photographer and the photographer of the image selected by the user is the user himself or herself in many cases, an image captured by the photographer other than the user can be found (it is effective in a case where images captured by each family member are aggregated into one system).

Furthermore, in a case where the attribute contained in the image is the number of captured images for each imaging target (subject), an image which does not include such a target (subject) can be found. In a case where the attribute contained in the image is an event recognized from the image, the main control unit 100 performs a process of detecting the event from the selected image and an image of an event different from the detected event is found. In addition, the main control unit 100 evaluates an image from not-selected images and the image having a low evaluation value may be found.

Furthermore, the main control unit 100 may detect a main subject included in the frequency equal to or more than the third threshold in the first image IS1 and the second images IS2 to IS12 selected by the user and may set, as the attribute contained in the image, a subject (main subject) different from the detected main subject. Even in such a case, the main control unit 100 may find an image having the attribute in which the frequency for the attribute contained in the image is equal to or less than the first threshold, from the first remaining image IR1 and the second remaining images IR2 to IR12. A predetermined number or more of images in which the main subject is the subject different from the detected main subject may be found. It is possible to find an image of the next main subject different from the main subject in the selected images.

Since information such as the imaging date which is an example of the attribute contained in the image is stored in a header of an image file in which the image data is stored, whether the frequency for the attribute contained in the image is equal to or less than the first threshold or not can be determined by using the information.

While the smartphone 1 is used in the above embodiment, a dedicated image processing apparatus, a personal computer, a tablet terminal, or the like other than the smartphone 1 can be used.

In addition, the order receiving server 151 instead of the smartphone 1 may perform at least one of the detection of the first remaining image (step 141 in FIG. 7), the detection of the second remaining image (step 142 in FIG. 7), or the process of determining the image having the attribute in which the frequency for the attribute contained in the image is equal to or less than the first threshold, from the first remaining image and the second remaining image (step 143 in FIG. 7). The smartphone 1 may issue an instruction to the printer 152 to print an image. In that case, the smartphone 1 and the printer 152 do not communicate through the Internet and communicate using WiFi or the like.

Furthermore, in the above embodiment, the images are printed one sheet at a time. However, instead of printing one sheet at a time, a plurality of images may be printed on one sheet (an example of an image product) or the images may be printed on a photo book (which is an example of the image product) composed of a plurality of pages.

Processing units executing the above process include not only the main control unit 100 functioning as various processing units by executing software but also a programmable logic device such as a field-programmable gate array (FPGA) capable of changing a circuit configuration after manufacturing, a dedicated electric circuit such as an application specific integrated circuit (ASIC) as a processor having a circuit configuration dedicatedly designed to execute a specific process, and the like.

One processing unit may be configured with one of those various processors or may be configured with a combination of two or more processors of the same type or different types (for example, a plurality of FPGAs or a combination of a CPU and an FPGA). A first example of configuring a plurality of processing units with one processor is such that as represented by a computer such as a client computer or a server, one processor is configured with a combination of one or more CPUs and software, and the processor functions as the plurality of processing units. A second example is such that as represented by a system on chip or the like, a processor that implements the function of the whole system including the plurality of processing units using one integrated circuit (IC) chip is used. Various processing units are configured using one or more of the various processors as a hardware structure.

Furthermore, the hardware structure of the various processors is more specifically an electric circuit in which circuit elements such as a semiconductor element are combined.

What is claimed is:

1. An image processing apparatus comprising:
   a first detection device for detecting, from a first image group, a first remaining image excluding one or a plurality of first images selected from the first image group;
   a second detection device for detecting, from a second image group, a second remaining image excluding one or a plurality of second images selected from the second image group; and
   an image output device for outputting an image having an attribute in which a frequency for the attribute contained in the image is equal to or less than a first threshold, from the first remaining image and the second remaining image.

2. The image processing apparatus according to claim 1, wherein the image output device outputs an image having an attribute in which the frequency for the attribute contained in the image is equal to or less than the first threshold and equal to or more than a second threshold.

3. The image processing apparatus according to claim 1, wherein the image output device outputs an image having an attribute in which the frequency for the attribute contained in the image is equal to or less than a threshold, from each of the first remaining image and the second remaining image.

4. The image processing apparatus according to claim 1, wherein the image output device outputs an image of which a similarity to the first image and the second image is equal to or less than a threshold, as the image having an attribute in which the frequency for the attribute contained in the image is equal to or less than the first threshold, from the first remaining image and the second remaining image.

5. The image processing apparatus according to claim 1, wherein, in the image output device, the attribute contained in the image is a main subject included in the image.

6. The image processing apparatus according to claim 5, wherein the main subject belongs to at least one of a person or an article.

7. The image processing apparatus according to claim 1, wherein, in the image output device, the attribute contained in the image is an imaging date, an imaging location, a photographer, or an imaging target.

8. The image processing apparatus according to claim 1, wherein the image output device sets, as the attribute contained in the image, a subject excluding a main subject for which a frequency is equal to or more than a third threshold in the first image and the second image, and outputs an image having the attribute in which the frequency of the attribute contained in the image is equal to or less than the first threshold, from the first remaining image and the second remaining image.

9. The image processing apparatus according to claim 8, wherein the image output device sets, as the attribute contained in the image, the subject excluding the main subject for which the frequency is equal to or more than the third threshold in the first image and the second image, and outputs a predetermined number or more of images having the attribute in which the frequency for the attribute contained in the image is equal to or less than the first threshold, from the first remaining image and the second remaining image.

10. The image processing apparatus according to claim 1, wherein an imaging time period of the first image group and an imaging time period of the second image group are different from each other.

11. The image processing apparatus according to claim 1, further comprising:
an image product creation device for creating an image product using the image output from the image output device.

12. An image processing apparatus comprising:
a processor, the processor may perform:
detecting, from a first image group, a first remaining image excluding one or a plurality of first images selected from the first image group;
detecting, from a second image group, a second remaining image excluding one or a plurality of second images selected from the second image group; and
outputting an image having an attribute in which a frequency for the attribute contained in the image is equal to or less than a first threshold, from the first remaining image and the second remaining image.

13. An image processing method comprising:
detecting, from a first image group, a first remaining image excluding one or a plurality of first images selected from the first image group by a first detection device;
detecting, from a second image group, a second remaining image excluding one or a plurality of second images selected from the second image group by a second detection device; and
outputting an image having an attribute in which a frequency for the attribute contained in the image is equal to or less than a first threshold, from the first remaining image and the second remaining image by an image output device.

14. A non-transitory computer-readable recording medium storing program controlling a computer of an image processing apparatus to perform:
detecting, from a first image group, a first remaining image excluding one or a plurality of first images selected from the first image group;
detecting, from a second image group, a second remaining image excluding one or a plurality of second images selected from the second image group; and
outputting an image having an attribute in which a frequency for the attribute contained in the image is equal to or less than a first threshold, from the first remaining image and the second remaining image.

* * * * *